United States Patent
Anderson et al.

(10) Patent No.: US 7,337,303 B2
(45) Date of Patent: Feb. 26, 2008

(54) THREAD INSTRUCTION ISSUE POOL COUNTER DECREMENTED UPON EXECUTION AND INCREMENTED AT DESIRED ISSUE RATE

(75) Inventors: Adrian John Anderson, Hertfordshire (GB); Martin John Woodhead, Hertfordshire (GB)

(73) Assignee: Imagination Technologies Limited, Hertfordshire (GB)

( * ) Notice: Subject to any disclaimer, the term of this patent is extended or adjusted under 35 U.S.C. 154(b) by 0 days.

(21) Appl. No.: 11/524,822

(22) Filed: Sep. 21, 2006

(65) Prior Publication Data

US 2007/0016757 A1 Jan. 18, 2007

Related U.S. Application Data

(62) Division of application No. 10/468,434, filed as application No. PCT/GB02/00742 on Feb. 19, 2002, now Pat. No. 7,269,713.

(30) Foreign Application Priority Data

Feb. 19, 2001 (GB) .................................. 0104045.0

(51) Int. Cl.
*G06F 9/46* (2006.01)
(52) U.S. Cl. ....................................... 712/214; 718/102
(58) Field of Classification Search ..................... None
See application file for complete search history.

(56) References Cited

U.S. PATENT DOCUMENTS 5,911,083 A 6/1999 Kuslak (Continued)

FOREIGN PATENT DOCUMENTS

EP 0 482 815 4/1992

(Continued)

OTHER PUBLICATIONS

Search Report dated Nov. 27, 2001 in United Kingdom.

(Continued)

*Primary Examiner*—Kenneth S. Kim
(74) *Attorney, Agent, or Firm*—Flynn, Thiel, Boutell & Tanis, P.C.

(57) ABSTRACT

A method and apparatus for controlling issue rate of instructions for an instruction thread to be executed by a processor is provided. The rate at which instructions are to be executed for an instruction thread are stored and requests are issued to cause instructions to execute in response to the stored rate. The rate at which instruction requests are issued is reduced in response to instruction executions and is increased in the absence of instruction executions. In a multi-threaded processor, instruction rate is controlled by storing the average rate at which each thread should execute instructions. A value representative of the number of instructions available and not yet issued is monitored and is decreased in response to instruction executions. Execution of instructions is prevented on a thread if the number of instructions available but not yet issued falls below a defined value. A ranking order is assigned to a plurality of instructions threads for execution on a multi-threaded processor. A plurality of metrics related to the threads and required for establishment of the rank order are provided. Each metric is assigned to a set of bits and these are assembled in a composite metric being assigned to the most significant bits and the least important metric being assigned to the least significant bits. A ranking order is then assigned to the composite metrics in dependence on their values.

13 Claims, 5 Drawing Sheets

U.S. PATENT DOCUMENTS

| | | | |
|---|---|---|---|
| 5,968,167 A | | 10/1999 | Whittaker et al. |
| 6,052,708 A | * | 4/2000 | Flynn et al. ................. 718/108 |
| 6,073,159 A | | 6/2000 | Emer et al. |
| 6,138,232 A | | 10/2000 | Shiell et al. |
| 6,421,701 B1 | * | 7/2002 | Elnozahy .................... 718/100 |
| 7,082,519 B2 | * | 7/2006 | Kelsey et al. ................ 712/228 |
| 2005/0021931 A1 | | 1/2005 | Anderson et al. |

FOREIGN PATENT DOCUMENTS

| | | |
|---|---|---|
| EP | 0 502 680 | 9/1992 |
| EP | 0 827 071 | 3/1998 |
| EP | 0 923 248 | 6/1999 |
| GB | 2 181 871 | 4/1987 |
| GB | 2 311 882 | 10/1997 |
| WO | WO 97/38372 | 10/1997 |
| WO | WO 99/21089 | 4/1999 |
| WO | WO 01/53939 | 7/2001 |

OTHER PUBLICATIONS

Search Report dated Jan. 9, 2002 in United Kingdom.

Search Report dated Jan. 10, 2002 in United Kingdom.

Invitation to pay Additional Fees and Communication Relating to the Results of the Partial International Search mailed Sep. 22, 2003 in PCT/GB02/00742.

Jeffay, K. and Bennett D., "A Rate-Based Execution Abstraction for Multimedia Computing", *Proceedings of the Fifth International Workshop on Network and Operating System Support for Digital Audio and Video*, vol. 1018, 1995, pp. 64-75 (12 pages).

Teik, Guan Tan and Hsu, Wynne, "Scheduling Multimedia Applications under Overload and Non-deterministic Conditions", *Real-Time Technology and Applications Symposium 1997, Proceedings*, Jun. 9, 1997, pp. 178-183.

Yau, David K. Y. and Lam, Simon S., "Adaptive Rate-Controlled Scheduling for Multimedia Applications", *IEEE/ACM Transactions on Networking*, vol. 5, No. 4, Aug. 1, 1997 (14 pages).

* cited by examiner

FIG. 1
BASE ARCHITECTURE

THREAD INSTRUCTION ISSUE POOL COUNTER DECREMENTED UPON EXECUTION AND INCREMENTED AT DESIRED ISSUE RATE

This application is a division of U.S. Ser. No. 10/468,434, filed Sep. 21, 2004 now U.S. Pat. No. 7,269,713, which was the national stage of International Application No. PCT/GB2002/00742, filed Feb. 19, 2002, published in English, the disclosure of which is hereby incorporated by reference.

This invention relates to the control of priorities and instruction issue rates on a multithreaded processor which is configured to process at any one time one of a number of different instruction threads.

This invention is particularly beneficial when used with a system such as that described in our international patent application no. WO97/38372 the contents of which are incorporated herein by reference. This document discloses a processing system which is able to manage the processing of a number of different instruction threads by one or more data processors. This architecture looks repeatedly to the resources available and the instructions which have to be executed to determine which instruction thread should be processed on a following clock cycle. Such an architecture has many advantages in real time systems where the processor interacts with external devices such as hardware peripherals or other processors. In a real time system it is crucially important to ensure that all processing associated with an event is completed within a defined time. This is easy to verify for a processor which only performs one task but becomes very complex when the processor has many tasks to perform. In a system in which a processor has multiple threads it is quite possible to disturb the operation of a program running on one thread by changing the behaviour of a program running on different thread. This lack of thread conformity makes it difficult to develop programs which can execute reliably without prior knowledge of what is running on other threads.

A conventional processor uses a priority system which permits urgent tasks to be handled more quickly than normal or non-urgent tasks. However, a processor which also has multiple hardware threads such as that described in WO97/38372 gives more flexibility than conventional processors and therefore requires a more flexible priority control.

Preferred embodiments of the present invention seek to provide an issue rate control scheme for a multi threaded processor system. In particular, preferred embodiments seek to permit a program executing on one thread to control its use of processor resources in such a way that the processing requirements of both that program and any programs executing on other threads are met. In order to do this the program must be able to: define the rate at which its instructions are issued regardless of the behaviour of programs executed on other threads; handle an urgent event quickly whilst controlling any disruption to programs executed on other threads; and, adapt to disruptions in its defined rate of instruction issue caused by the handling of urgent events on other threads.

The preferred embodiment is sufficiently robust to enable a thread to recover from processor overload in a reliable way, and to ensure that deviation from the defined bounds of execution rate on a thread can be detected.

Furthermore it seeks to provide a control scheme that can operate at a number of levels of complexity whilst allowing a programmer to ignore aspects of the scheme that he does not require.

A further embodiment seeks to minimize processor power consumption by clocking the processor at the minimum rate required to complete all its tasks.

Preferred embodiments seek to assign ranked priorities to instruction threads to ensure the most effective use of processor resources.

The invention is defined in the appended claims to which reference should now be made.

A preferred embodiment of the invention will now be described in detail by way of example with reference to the accompanying drawings in which.

Figure 1:
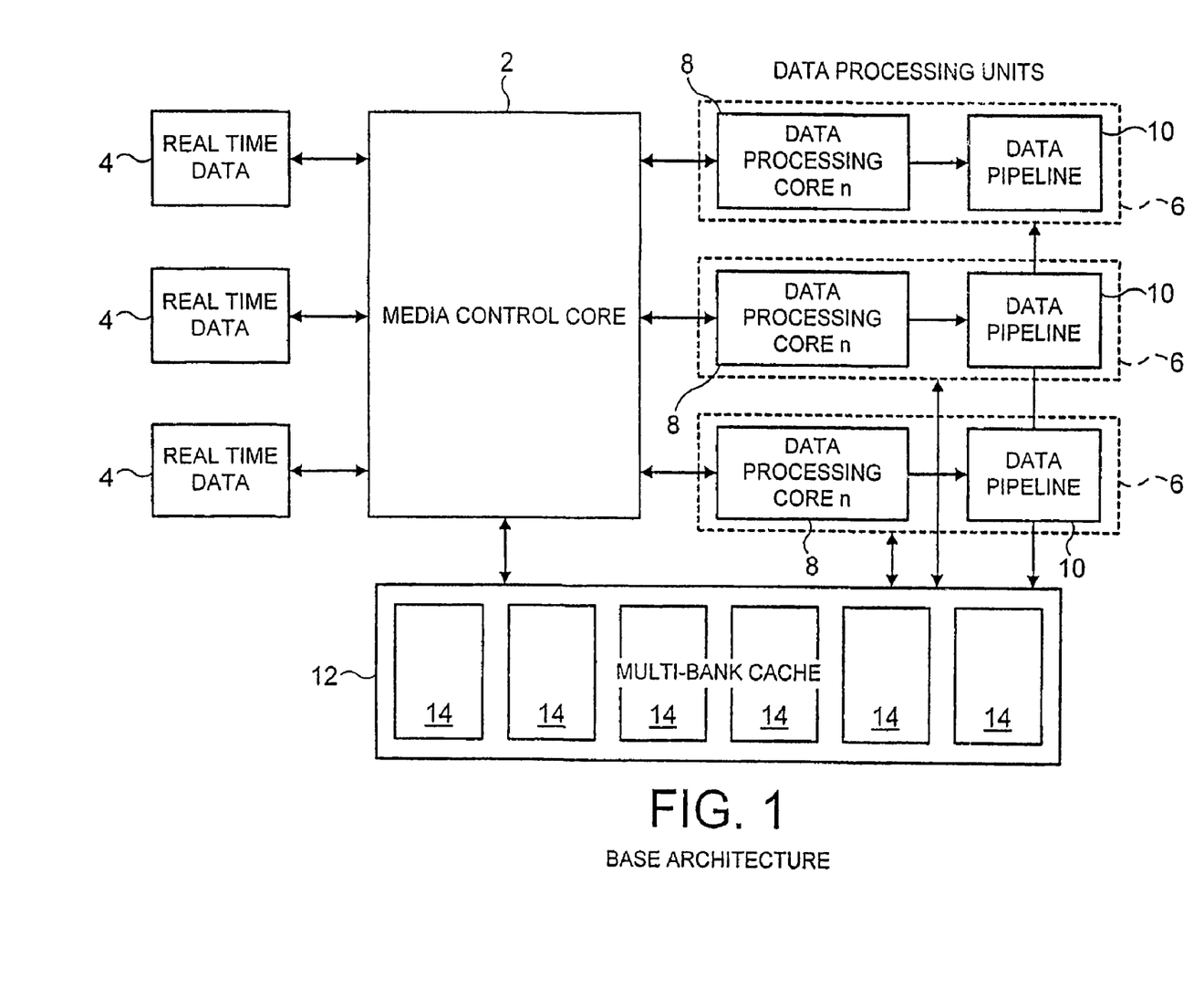
FIG. 1 is a block diagram of the base architecture or a multithreaded processor system.

The base architecture of the embodiment of the invention described here is shown in FIG. 1. The central part of this is a media control core (MCC) 2 which comprises a fine grained multithreaded processor. It has a plurality of inputs and outputs which can be coupled to real time data input and output devices 4 which may be, for example, video sources, audio sources, video outputs, audio outputs, data sources, storage devices, etc. In the most simple example only a single input and a single output will be provided.

Also coupled to the MCC 2 are a plurality of data processing units 6. Each of these comprises a data processing core 8 which controls the processing of data via a data pipeline 10. The core 8 decodes and sequences micro instructions for the pipeline 10.

Also coupled to the media control core 2 is a multibank cache memory 12 from which data may be retrieved by the MCC 2 and data processing unit 6 and into which data may be written by the MCC 2 and the data processing units 6. It includes temporary storage for data and instructions to be performed by the data processing cores on the input data and other internally generated data. These various sets of instructions will, when activated, comprise processing threads.

The MCC 2 is a fine grained multithreading processing unit which directs data from inputs 4 to data processing cores 6 or to storage in cache 12 and provides data to outputs. It is arranged so that it may switch tasks on every clock cycle should this be required. To achieve this it checks on every clock cycle which possible operations it could perform by looking at the tasks to be performed and the resources available for those tasks to be performed. It also checks which of these tasks have the highest priority. More than one operation can commence on each clock cycle if sufficient processing power is provided.

This resource checking ensures that everything required for a particular task to be performed is in place before an instruction is issued, including external resources such as data to an input port, or availability of data storage devices or outputs. It also includes the checking of internal resources such as registers for temporary storage, processing cores, or previously processed data required for a particular new processing operation. The MCC 2 operates to direct data from an input to an appropriate data processing unit 6 and for processing to take place routes appropriate instructions to the unit 6, and routes processed data to an output when required, making use of the cache as necessary. Once execution of a set of instructions is commenced on a processing unit the MCC 2 can look again at the various threads it can run and resources available for these whilst the program continues to run on the data processing unit.

This resource and priority checking means that tasks which perform on real time data such as video input are able to be performed without the large memory buffers usually required for real time inputs. In e.g. video input, the MCC will look to see whether data is available at the IO port and if it is will receive that data and send it to either a portion of the multibanked cache or to data storage registers in preparation for processing by one of the data processing unit 6.

Scheduling of the data processing unit 6 is under the control of MCC 2. For example, the data pipeline 10 of FIG. 1 will be made up of a number of processing elements such as multipliers, adders, shifters, etc., under the control of an associated data processing core 8 which runs a sequence of instructions retrieved from the cache to perform a data processing algorithm. Each of these processing cores has its own micro instruction ROM and/RAM storing sequences of instruction to perform a particular data process. The MCC 2 invokes the data processing unit 6 to perform its particular operation sequence by e.g. passing an address offset into its micro instruction ROM and instructing it to commence execution. It will then perform a particular process on either data from the multibank cache or on data passed from one of the inputs to the MCC 2 until it has completed, at which point it will signal to the MCC 2 that its processing is complete.

In this embodiment of the present invention, the thread scheduling performed by the MCC 2 has two main elements. These are thread instruction issue rate control and thread priority. Instruction issue rate control allows the number of million instructions per second (MIPS) requested by each thread to be defined as a burst rate Bn. This allows the processor loading to be balanced so that each thread can operate independently of activity on other threads. So long as the total loading never exceeds the processor capacity, issue rate control is the only mechanism required to ensure that all the threads receive the processor resources they require.

If the total loading requested by all the threads exceeds the processor capacity, the thread priority mechanism allows processor resources to be applied to the highest priority threads first. The issue rate control system monitors the processing deficit for the lower priority threads which do not receive the processor resources they have requested, and ensures that the balance is restored once the processor overload has ended. The issue rate control mechanism and priority mechanism are described below.

Each thread being monitored by the MCC 2 can be in one of two states. These are WAITING and RUNNING. In the WAITING state the thread is blocked on an external event such as a trigger and the instruction issue rate is zero. In the RUNNING state the thread is executing normally and the instruction issue rate is controlled by a value written to a burst rate register 46 (Bn) which is shown in the Schematic diagram of FIG. 4.

Generally speaking, an executing thread will have periods of WAITING for events which synchronize the operation of the program and periods of RUNNING when tasks are performed. In some cases a thread may execute continuously without WAITING on any synchronizing event. Both patterns of execution are handled by an issue rate control scheme which will be described below.

The total of all the burst rates requested by all the processor threads may exceed the processor capacity. Each thread being processed has an assigned priority which is used to determine the choice of thread for instruction issue.

On each clock cycle the MCC identifies the threads which can accept a new instruction, and chooses the thread with the highest priority. This ensures that when the processor is overloaded for a period, it is the least important threads that are slowed down.

The priority control mechanism interacts with thread scheduling logic in the MCC as does the issue rate control mechanism, which can optionally also interact with the clock generator.

The signals which implement the interface between the priority and instruction issue rate control systems and the processor instruction scheduler are described in table 1 below for a processor with four instruction threads. This number is selected purely by way of example and any other number of threads can be used.

| I/O | Signal Name | Description |
|---|---|---|
| Priority Signals | | |
| TO scheduler | RANK0id | RANK0id indicates the identity of the thread with the lowest ranking. |
| TO scheduler | RANK1id | RANK1id indicates the identity of the thread with ranking 2 of 4. |
| TO scheduler | RANK2id | RANK2id indicates the identity of the thread with ranking 3 of 4. |
| TO scheduler | RANK3id | RANK3id indicates the identity of the thread with the highest ranking. |
| Issue Rate Control Signals | | |
| TO scheduler | FREEZEn (n=0:3) | Indicates that thread n wishes to halt instruction issue. FREEZEn acts as an interlock signal to the instruction scheduler. |
| TO scheduler | REQUESTn (n=0:3) | Indicates that thread n requires the issue of an instruction |
| FROM scheduler | GRANTn (n=0:3) | Indicates that an instruction has been issued to thread n. |
| FROM scheduler | BLOCKEDn (n=0:3) | Indicates that thread n is blocked (waiting) on an external event such as a trigger. |

The behaviour of the instruction scheduler on each processor cycle is generally defined by the following rules:

1. Disregard all threads which are blocked (cannot run) and all threads which have asserted their FREEZE signals.
2. Schedule the highest priority thread which is not blocked and does not have its FREEZE signal asserted and has asserted its REQUEST signal.
3. If no thread has been scheduled at stage 2, schedule the highest numbered non-REQUEST-ing thread which is not blocked and does not have FREEZE asserted.
4. If a thread is scheduled, assert the corresponding GRANT signals.

This mechanism influences the thread instruction issue rate but does not directly control it on a cycle by cycle basis.

An optional clock gating circuit in the clock generator ensures that processor clock pulses are deleted whenever all the signals REQUESTn are de-asserted. Thus the gated processor clock rate may be controlled to run at exactly the rate required to achieve the total instruction rates demanded by all the threads, and thus processing power consumption may be kept to a minimum.

The MCC 2 of FIG. 1 is scalable in all important respects. Because it is constructed from banks which localize storage (register files) and processing (ALU) additional banks can be added without creating any unmanageable routing and interconnection problems. The number of processing threads which can be supported can then be increased by adding registers to the program counter bank included in the multi-bank cache and modifying the control unit accordingly. The number of input/output streams which can be supported by the MCC can be increased by adding further I/O banks.

Figure 2:
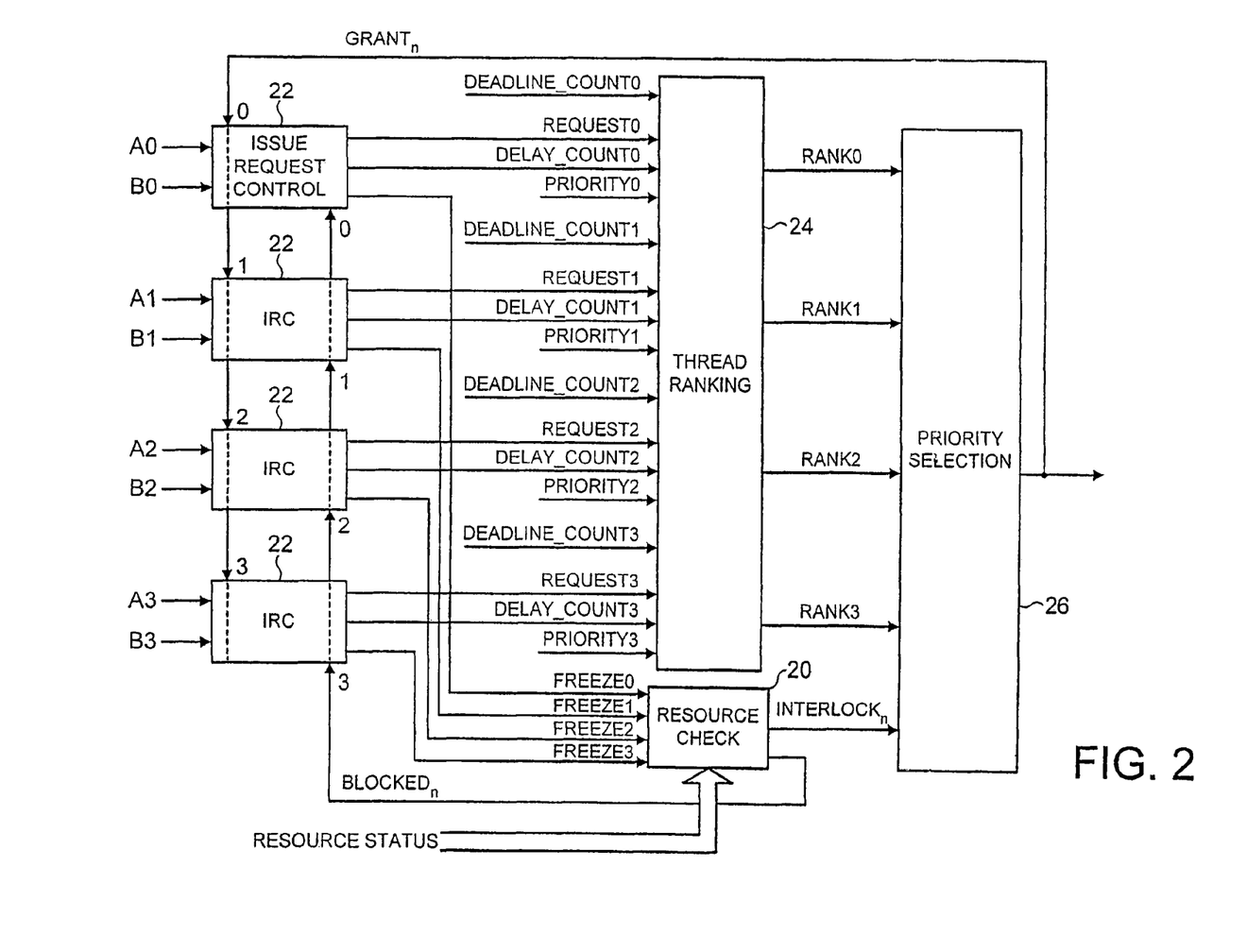
FIG. 2 is a block diagram of the thread scheduling portion of the Media Control Core of FIG. 1.

A block diagram of the portion of the MCC 2 which deals with thread scheduling is shown in FIG. 2. It comprises a resource checker 20 which receives resource status information relating to the status of data processing units, pipeline and memory bank status, and I/O port status along with connections to a FREEZEn signal output from each of a set of issue request control units 22. These issue request control units 22 each have a REQUESTn output and a DELAY_COUNTn output to a thread ranking unit 24. This also receives a PRIORITYn signal and a DEADLINE_COUNTn signal associated with each instruction thread. The sources of these two signals will be described with reference to FIGS. 4 and 5. This thread ranking unit sends out ranking signals for each instruction thread to a priority selection unit 26.

The priority selection unit 26 also receives interlock signals from a resource checker 20 which indicate which of the threads have the resources available to be executed. Thus, if the highest rank thread does not have all its resources available, the priority selection unit will select the next highest ranked thread which has resources available. The priority selection unit 26 has a GRANTn output which indicates which thread will execute an instruction on the next clock cycle. This GRANTn signal is also fed back to the issue rate request control units 22.

Because of the indirect nature of the interaction with the scheduler shown in FIG. 2 there may be some delay between the assertion of a REQUESTn signal and the issue of an instruction on an associated thread. This delay may be very long if the processor is overloaded, and therefore a buffer is required to hold instruction issue requests. The issue request buffer is implemented as a counter called the DELAY_COUNTn accumulator 42, which forms part of the issue request control unit 22.

Figure 4:
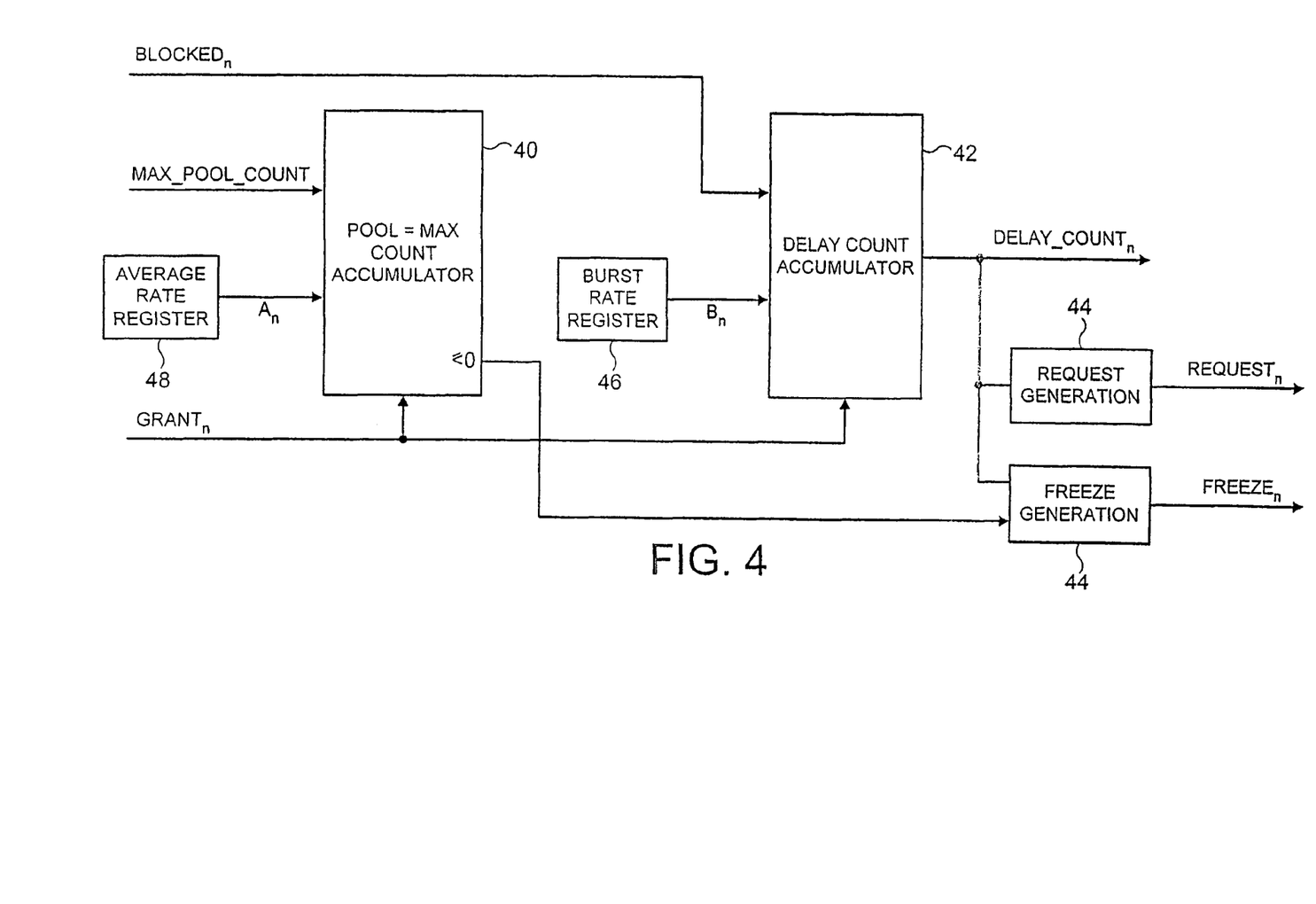
FIG. 4 is a block diagram of the issue request control circuitry of FIG. 2.

The issue request control unit is shown in detail in FIG. 4. The unit comprises a POOL_COUNTn accumulator 40 and a DELAY_COUNTn accumulator 42. The POOL_COUNTn accumulator 40 receives a value from the MAX_POOL_COUNTn register 49 which represents the maximum allowable value in the POOL_COUNTn accumulator 40. It also receives a value from the average rate register 48 (An). The DELAY_COUNTn accumulator 42 receives a signal BLOCKEDn on one of its inputs and on its other input it receives the value in the burst rate register 46 (Bn). Both POOL_COUNTn accumulator 40 and DELAY_COUNTn accumulator 42 receive a signal GRANTn from the priority selector 26 of FIG. 2.

The DELAY_COUNTn accumulator 42 and the POOL_COUNTn accumulator 40 influence thread execution independently of each other and are therefore described separately. First we describe the operation of the DELAY_COUNTn accumulator 42.

A thread defines the instruction issue rate required for a particular task by writing a value to its burst rate register 46. The value in the burst rate register 46 is repeatedly added into the DELAY_COUNTn accumulator 42 to represent the rate at which instruction issues are required by thread n. The DELAY_COUNTn accumulator 42 is decremented each time the signal GRANTn is asserted, so that if the processor executes instructions at the rate defined by the value in Bn then the value in the DELAY_COUNTn accumulator 42 will remain close to zero. If the processor is unable to execute at the rate defined by the value in Bn, there will be a residual positive value in the DELAY_COUNTn accumulator 42. The value in the DELAY_COUNTn accumulator 42 represents the number of instruction issues that thread n requires for its current task but has not yet received. The value in the DELAY_COUNTn accumulator 42 is used to generate the signals REQUESTn and FREEZEn for thread n so that the instruction issue rate on the thread is controlled.

The value written to Bn to define the required instruction issue rate is calculated by the equation:

$$Bn = \text{required\_issue\_rate}/\text{delay\_count\_update\_rate}$$

The DELAY_COUNTn accumulator 42 may be updated on every processor clock cycle, in which case Bn is calculated by: $Bn = \text{required\_issue\_rate}/\text{processor\_clock\_rate}$ In order to save power, the DELAY_COUNTn accumulator 42 may be updated only once in each accumulation period of KR processor clock cycles, where KR is the rate control decimation factor. On each update the value in the burst rate register 46 is added to DELAY_COUNTn, and at the same time DELAY_COUNTn is decremented by the number of times that GRANTn was asserted during the accumulation period. The use of this mechanism ensures that the value in DELAY_COUNTn accumulator 42 at the end of each accumulation period matches the value it would have held if updates were applied on every processor clock cycle. At all other times the values may differ. Nevertheless, power consumption is reduced by a factor of KR, at the cost of coarser ting resolution.

The value of KR must be chosen as a compromise between power consumption and granularity of instruction issue control. As a guide, it is expected that the value of KR in a range 4-16 should give acceptable timing granularity, whilst keeping power consumption to a reasonable level.

If the DELAY_COUNTn accumulator 42 is updated once every KR processor clock cycles, then Bn is calculated by the equation:

$$Bn = \text{required\_issue\_rate} * KR/\text{processor\_clock\_rate}$$

The program running on a thread may write to its burst rate register 46 at any time to define a new instruction issue rate. Typically this will be done in response to an event which requires processor activity, or in response to the completion of a task.

The BLOCKEDn signal to the DELAY_COUNTn accumulator is generated by the resource checker 20 of FIG. 2 and indicates that execution on the thread is blocked waiting for an external event. When BLOCKEDn is asserted, updates of the DELAY_COUNTn accumulator 42 are inhibited. When BLOCKEDn is deasserted indicating that an event has happened, the DELAY_COUNTn accumulator 42 is initially cleared and is subsequently updated once every accumulation period by the addition of the value Bn, and by the subtraction of one every time the signal GRANTn is asserted.

The DELAY COUNTn accumulator 42 value is limited to the largest 2's complement value it can represent so that it can avoid errors due to number wrapping. In operation, the DELAY_COUNTn accumulator 42 ensures that the instruction issue rate matches the rate defined by the burst rate register 46, provided that its value does not reach the maximum.

The REQUESTn generation unit 44 of FIG. 4 receives an output from the DELAY_COUNTn accumulator 42, and in response to this generates a REQUESTn signal to the thread ranking unit. The DELAY_COUNTn signal is also output directly to the thread ranking unit. The FREEZEn generation unit 45 of FIG. 4 receives an outputs from the DELAY_COUNTn accumulator 42 and the POOL_COUNTn accumulator 40, and in response to these it generates a FREEZEn signal to the resource checking unit 20.

The REQUESTn generation unit 44 determines the number of instructions to be requested during the next accumulation period by examining the value of DELAY_COUNTn at the start of that period, and asserting REQUESTn the appropriate number of times. REQUESTn will not be asserted if DELAY_COUNTn is less than or equal to zero. REQUESTn will be asserted KR times if the value of DELAY_COUNTn is greater than or equal to KR. REQUESTn will be asserted DELAY_COUNTn times if the value of DELAY_COUNTn is greater than zero and less than KR. The REQUESTn generation unit 44 ensures that the instruction requests are maximally distributed over the accumulation period by assertion of REQUESTn at the appropriate times.

A succession of GRANTn assertions may lead to DELAY_ COUNTn falling below Hero, thus causing REQUESTn to be de-asserted and freeing up processor capacity for other threads to execute. Subsequent additions of the value in burst rate register 46 will cause DELAY_COUNTn to increase above zero thereby causing REQUESTn for that thread to be asserted.

The output of the DELAY_COUNTn accumulator 42 is connected to a FREEZEn generation unit 45 which sends a FREEZE signal to the resource checker. The other input to this FREEZEn generation unit 45 is the output of the POOL_COUNTn accumulator 40. If the clock gating option referred to above is implemented, then the instruction issue rate on thread n is controlled by the signal REQUESTn, and if not implemented then the instruction issue rate is controlled by the signal FREEZEn.

If the clock gating option described above is implemented then FREEZEn is asserted when DELAY_COUNTn is less than −15 and is de-asserted when DELAY_COUNTn is greater than zero. If clock gating is not implemented, FREEZEn is asserted when DELAY_COUNTn is less than zero and de-asserted when DELAY_COUNTn is greater than Bn.

The operation of the DELAY_COUNTn accumulator 42 controls the rate at which instructions are issued so that it matches the rate defined in the burst rate register 46. This may be changed frequently as thread loading varies and thus it is difficult to ensure that the total processor loading due to one thread is bounded so that it does not exceed a defined value. A POOL_COUNTn accumulator 40, with value POOL_COUNTn is therefore provided to keep track of the average processor load and to limit the duration of processor overloads, and to ensure that no one thread can take over the processor. We now describe the operation of the POOL_COUNTn accumulator 40.

A thread n which defines the average instruction issue rate that it requires does this by writing to its average rate register 48 (An). POOL_COUNTn accumulator 40 is incremented at a regular rate defined by the value in An and is decremented each time GRANTn is asserted for that thread. This is done using the same KR processor clock cycle accumulation period as is used to update the DELAY_COUNTn accumulator. If the POOL_COUNTn accumulator 40 is updated once every KR processor clock cycles, then An is calculated by the equation:

$$An = average\_issue\_rate * KR / processor\_clock\_rate$$

The program running on a thread will typically write to its average rate register 48 only once, when the program is started. Having established the average instruction issue rate that it requires, the value in the average rate register 48 will usually not be altered.

The value in the POOL_COUNTn accumulator 40 represents the number of instruction issues that a thread may require to complete its tasks bout has not yet received. The value in the POOL_COUNTn accumulator 40 may be read by programs executing on other threads to assess the maximum possible duration of a processor overload. If POOL_COUNTn accumulator 40 becomes zero or negative then REQUESTn is de-asserted for that thread regardless of the condition of the DELAY_COUNTn accumulator 42, because the zero or negative value indicates that thread n has exhausted its allocation of instruction issues.

The value in the POOL_COUNTn accumulator 40 is limited to a maximum value defined by the MAX_POOL_COUNTn register 49. This defines the number of instructions that a thread may build up "on account" to be executed later at a higher rate, and placing a limit on this value allows the duration of processor overloads to be bounded. When the POOL_COUNTn accumulator 40 reaches the value in the MAX_POOL_COUNTn register 49, further increments of the POOL_COUNTn accumulator 40 are inhibited. Thus, a thread which waits for an external event before executing at a high rate may build up a 'reservoir' of instructions in POOL_COUNTn accumulator 40 while it waits, and then executes at a higher rate defined by the burst rate register 46 for a limited time following the event. Any processing deficit in other threads which builds up during the high rate execution burst will be balanced later by the operation of their DELAY_COUNTn accumulators 42.

It is possible to provide a facility which enables extra instructions to be issued to a thread such that the value in POOL_COUNTn accumulator 40 will go to a negative value. This can only happen if it is not preventing any other thread from receiving its required instruction rate. That is to say, this facility enables the allocation of spare instructions to other threads, thereby optimizing processor usage.

A default mode of operation is called 'cycle strict'. In this mode, FREEZEn is asserted when the POOL_COUNTn accumulator 40 becomes zero or negative via the FREEZEn generator 44 of FIG. 4 and the thread will not receive any more instruction issues until the POOL_COUNTn accumulator 40 is greater than zero again, as a result of increments by the value of the average rate register 48. Thus, a hard limit is enforced to the load that a thread can place on the processor.

In the optional 'cycle lenient' mode, FREEZEn is not asserted when the POOL_COUNTn accumulator 40 is less than one. If this state arises and the thread with an empty instruction pool can run when no other threads is available to receive an instruction issue, the instruction scheduler may issue an instruction to the thread with an empty pool, causing the value of the POOL_COUNTn accumulator 40 to become more negative.

It should be noted that REQUESTn is de-asserted when the POOL_COUNTn accumulator 40 is less than one regardless of the mode of operation. It should also be noted that a real time system will normally be designed such that the POOL_COUNTn accumulator 40 never empties.

When the POOL_COUNTn accumulator 40 reaches the most negative value it can represent, further decrements are inhibited to ensure that the accumulator value does not wrap from a negative value to a positive one.

In summary, therefore, the circuitry of FIG. 4 will cause a REQUESTn signal to be generated in response to the DELAY_COUNTn accumulator 42, and a FREEZEn signal in response to the DELAY_COUNTn accumulator 42 or the POOL_COUNTn accumulator 40. If neither REQUESTn nor FREEZEn is asserted, an instruction will be issued to thread n if no other threads can run, but any other thread which can run will take priority over thread n.

The instruction threads which run on the processor have a number of different possible states. These are as follows:

RUNNING State

In this state instructions are normally issued at the rate defined by the value in the burst rate register 46. The DELAY_COUNTn value will normally stay close to zero unless another thread has a burst of high execution rate. The value in the DELAY_COUNTn accumulator 42 represents the number of instructions by which the thread has been delayed from its intended pattern of execution, either by stalling or by the operation of other threads.

POOL_EMPTYn State

When the POOL_COUNTn accumulator 40 is zero or less than zero, for a particular thread then the thread is defined as being in the POOL_EMPTYn state. In this state the thread operates as it does in the running state but the issue rate may be limited to the value AN from its average rate register 48, if the thread is operating in cycle strict mode. Protection is provided to the other threads in the event that thread n attempts to run at an issue rate great than AN for a long time. In normal operation the POOL_EMPTYn state should never be entered.

WAITING State

When a thread is blocked on an external event such as a trigger, BLOCKEDn is asserted by the resource check unit 20 and the thread is defined as WAITING. If the clock gating option described above is implemented then no processor clock pulses are produced for the thread in the WAITING state.

The priority control selection unit 26 of FIG. 2 provides, to the instruction scheduler in the media control core of FIG. 1, a rank order of preference for the threads. In the condition when the total of all thee burst rates Bn for all the input threads is lower than the available processor instruction rate, the priority mechanism has no net effect. That is to say, the priority control unit is only relevant when the processor is overloaded.

Figure 3:
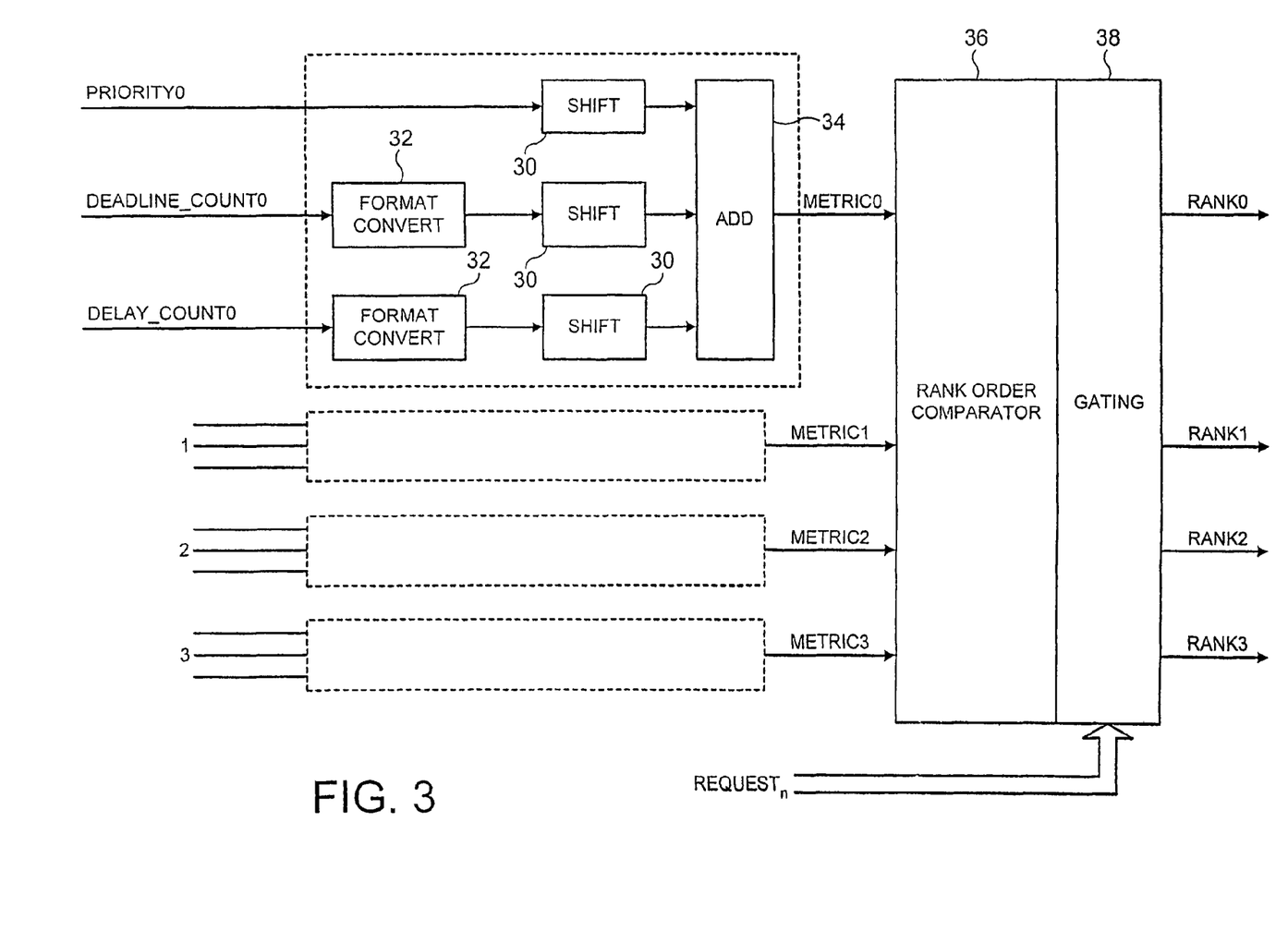
FIG. 3 is a block diagram of the thread ranking circuitry of FIG. 2.

In the event of processor overload, the instruction scheduler issues instructions to the thread with the highest rank that is not interlocked. A combination of three metrics is used for establishing the rank order of threads, as illustrated in FIG. 3. This processor is described below.

The inputs to the thread ranking unit relating to each instruction thread are numbered 0, 1, 2, and 3. Only thread 0 is fully illustrated. The priority signal for a thread is input to a shift register from which it is supplied to an adder. DEADLINE_COUNT and DELAY_COUNTn each enter format conversion units 32 before passing to similar shift registers 30 to normalize them with the priority signal before all three are combined in an adder 34 thus producing a metric relating to that thread. Similar metrics are produced for each other thread and these are compared in a rank order comparator 36. This includes a gating unit 38 which then assigns a rank to each of the threads. These ranks are output in parallel.

The metric with highest significance in establishing rank order is the thread priority. A thread defines its priority by writing an unsigned byte value to its priority register. The larger the number in this priority register, the higher its ranking.

Figure 5:
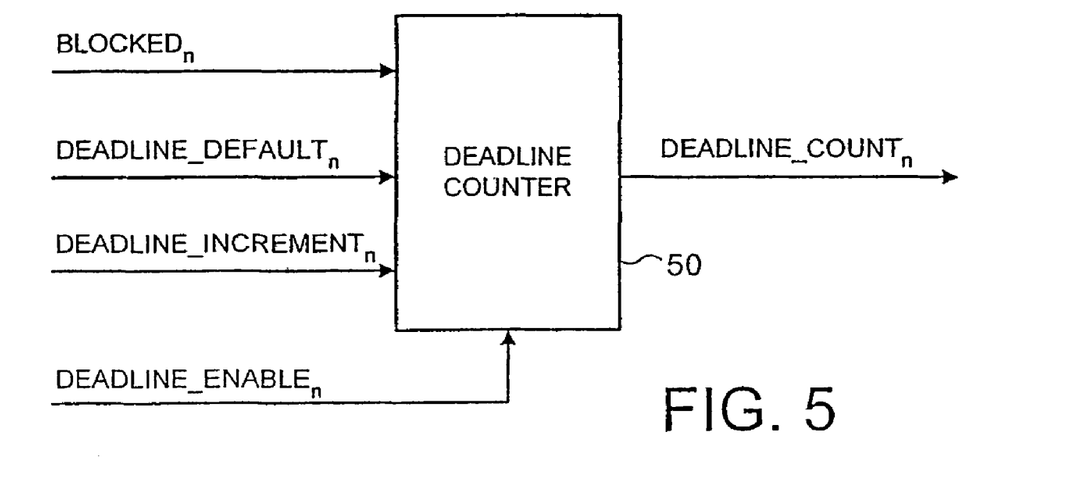
FIG. 5 shows the arrangement of the deadline counter.

The second highest significance metric is the DEADLINE_COUNTn illustrated in FIG. 5 and this provides a second input to the thread ranking unit 24. The DEADLINE_COUNTn mechanism allows a thread to define a deadline time within which it must complete a task. The DEADLINE_COUNTn register 50 is held static when the thread is in the WAITING state, and it is initialized to DEADLINE_DEFAULTn and subsequently decremented at a regular rate when the thread changes from the WAITING state to the RUNNING state in response to an external event.

The inputs to the deadline counter 50 are the BLOCKEDn signal from the resource checker 20, the value held in the DEADLINE_DEFAULT register, representing the maximum deadline for that thread to execute, a DEADLINE_INCREMENTn value which is added to DEADLINE_COUNTn to adjust the deadline-when a thread handles a number of different events each with different deadlines, and a DEADLINE_ENABLEn signal to enable the operation of the DEADLINE_COUNTn counter.

The initialization value represents the time from the event to the expiry of the shortest deadline. The DEADLINE_COUNTn register 50 then decrements at a regular rate, ensuring that its value represents the time remaining to expiry of the deadline. In order to save power, DEADLINE_COUNTn is updated only once in every period of KD clock cycles, where KD is the deadline counter decimation factor, in a similar manner to the updating of the DELAY_COUNTn accumulator 42 of FIG. 4. As DEADLINE_COUNTn decreases, so the ranking of its thread should increase. If all threads are provided with a deadline priority mechanism then the processor resources are allocated in the best way to ensure that all deadlines are met. In a typical system there may be threads which do not have deadlines and therefore it is not absolutely necessary for all threads to use this mechanism.

When a thread returns to WAITING state from the RUNNING state, the DEADLINE_COUNTn register stops decrementing, holding its final value until it leaves the WAITING state again, at which point it is re-initialized to a new value of DEADLINE_DEFAULTn.

A thread may handle a number of different events, each with different deadlines. In this case, the DEADLINE_DEFAULTn register input to the DEADLINE_COUNTn 50 is programed to represent the shortest deadline to be handled. If an event with a longer deadline occurs then its thread writes a deadline increment to a register DEADLINE_INCREMENTn (not illustrated) and this is then added to the value in the deadline counter 50.

A DEADLINE_ENABLEn input to deadline counter 50 enables the deadline counter to be switched on or off with a control bit. When the deadline counter is disabled DEADLINE_COUNTn is set to its maximum value. A further input (not illustrated) can be used to halt the decrementing of DEADLINE_COUNTn during soft deadline scheduling.

The deadline counter 50 only operates correctly if a thread n is in the WAITING state when an event with the deadline occurs. This can only be guaranteed where a thread handles only one event, and where event handling must complete before the next event. Where such restrictions are not enforced, deadline control must be handled by a separate processing thread dedicated to the task.

Such a dedicated deadline control thread would perform the initial handling of all events, noting the deadline expiry time and then queuing the events to the appropriate threads. The work done by this thread is kept to a minimum so that the time taken to detect an event is as short as possible. When a thread picks up an event from its queue it adjusts DEADLINE_COUNTn for that thread by an amount recorded in the task queue entry via the deadline control thread. The adjustment value will be calculated by the deadline control thread at the time when the event occurs.

The metric with the lowest significance used by the thread ranking unit is DELAY_COUNTn, described above. If this metric is used to control the thread ranking, then in the event of a processor overload, the instruction scheduler allocates processor resources so that all threads experience the same delay from their intended processing profile.

For each thread, the three metrics are combined into a single composite metric by concatenation in the adder 34 of FIG. 3. Priority is in the most significant position and DELAY_COUNTn in the least significant.

The format converter 32 performs a bit wise inversion on the DEADLINE_COUNTn to ensure that a reducing count gives an increasing number. DELAY_COUNTn has its most significant bit inverted to convert it from 2's complement to offset-binary representation. This is to avoid misinterpretation of negative count values.

The composite metrics are placed in rank order by the rank order comparator 36 which uses a sequential implementation of what is known as a bubble-sort algorithm. This is as follows:

1. On each clock cycle of the sorter, two composite metrics are compared and their rankings are swapped if the lower ranking value is greater than or equal to the higher ranking value.
2. On successive clock cycles, the comparison proceeds from the lowest ranking pair of composite metrics towards the highest ranking pair.
3. On the clock cycle following the comparison of the highest-ranking pair of composite metrics, the lowest ranking pair are compared.

The effect of this algorithm is to place the largest composite metric in the highest ranking position in no more than N−1 clock cycles (where N is the number of threads), and can establish the correct order in a maximum of $N^2/2-N/2$ clock cycles. If two or more composite metrics have identical values, their rank orders will cycle over time due to the swap taking place if values are equal. This behaviour emulates equal ranking by time slicing, therefore ensuring that the threads with equivalent composite metrics all receive equivalent priority from the instruction scheduler.

The scheme described will control the instruction issue rates on all threads, provided that the processing limits of the processors are not exceeded. If they should be exceeded, it may be helpful to provide detection mechanisms to assist the debugging and characterization. These are described below.

To monitor and control instruction issue shortfall and excesses, two triggers are provided for each thread. The POOL_FILLEDn trigger is set when the POOL_COUNTn accumulator 40 value equals the value in the MAX_POOL_COUNTn register 49. The POOL_EMPTY trigger is set when the POOL_COUNTn accumulator 40 value is zero or negative. The states of POOL_FILLEDn and POOL_EMPTYn and the value of POOL_COUNTn accumulator 40 can then be read from a status register. The value of DELAY_COUNTn can be read from a status register. The deadline priority mechanism can be monitored by a trigger for each thread. This is called DEADLINE_MISSEDn and is set when DEADLINE_COUNTn falls to zero. The state of DEADLINE_MISSEDn and the value of DEADLINE_COUNTn can both be read from the status register.

A summary table of the registers and triggers of the issue rate control system described here are listed below in table 2.

| IO | Name | Format N | F | T | Description |
|---|---|---|---|---|---|
| R/W | An | 8 | −4 | t | (average instruction issue rate in MIPS) * KR_/R+ |
| R/W | Bn | 8 | −4 | t | (Burst instruction issue rate in MIPS) *KR/R |
| R/W | PRIORITYn | 8 | 0 | u | Thread priority |
| R/W | DEADLINE_DEFAULTn | 20 | 0 | u | Default deadline for thread (in units of KD*/R) |
| W | DEADLINE_INCREMENTn | 20 | 0 | u | Value by which to extend deadline counter (in units of KD/R) |
| R/W | MAX_POOL_COUNTn | 22 | 0 | U | Maximum value of instruction pool counter |
| R/W | AMA_CONTROLn | 3 | 0 | u | AMA control register |
| R | DELAY_COUNTn | 27 | −4 | t | Number of instructions that thread n has been delayed from its required burst rate. |
| R/W | DEADLINE_COUNTn | 20 | 0 | u | Number of cycles remaining until event deadline expiry# |
| R | POOL_COUNTn | 27 | −4 | t | Number of potential instructions available to thread |
| R | DEADLINE_MISSEDn | — | — | — | Trigger indicating deadline has expired |
| R | POOL_FILLEDN | — | — | — | Triggger indicating instruction pool has filled (reached MAX_POOL_COUNTn) |
| R | POOL_EMPTYn | — | — | — | Trigger indicating instruction pool has emptied |

+R is the processor clock rate in MHz.
The 20 bits of DEADLINE_COUNTn are read in positions D[23 . . . 4], ensuring that the count value read by the MCC is the number of cycles remaining (truncated to the next lowest multiple of KD).
Format:
N—total number of bits
F—number of fractional bits
T—data storage type:
u—unsigned data
t—2's complement data.
AMA control register:
Bits are provided for:
cycle strict operation
deadline disable
deadline halt A DELAY_COUNTn with 23 integer bits as given in Table 2, accumulates to a maximum of $2^{22}$—approximately 4 million instructions. For a 50 MHz instruction issue rate, the counter can accumulate for about 80 ms. This is the same for the POOL_COUNTn.

A 20 bit DEADLINE._COUNTn accumulates to a maximum of $2^{20}$. Given a deadline decimation factor (KD) of 16, the DEADLINE_COUNTn can therefore represent a maximum of approximately 16.7 million cycles. For a 200 MHz processor, this represents a deadline of approximately 84 ms.

The invention claimed is:

1. A method adjusting a value representative of not yet issued instructions for threads executing on a multithreaded processor comprising the steps of:
    storing an average rate at which each thread is intended to issue instructions;
    monitoring the value representative of the number of instructions not yet issued for a thread;
    increasing the value representative of the number of instructions not yet issued at a rate dependent upon the stored average rate for each thread; and
    decreasing the value representative of the number of instructions not yet issued for a thread each time an instruction is issued on the thread.

2. A method according to claim 1 including the step of accumulating the value representative of the number of instructions not yet issued for a thread in a pool count accumulator.

3. A method according to claim 2 including the step of setting a maximum value on the number of instructions that can be accumulated for a thread.

4. A method according to claim 2 in which a thread which builds up an accumulation of instructions not yet issued may be allocated a burst of execution time in which the instructions execute at a higher rate, the burst being bounded by the accumulated value.

5. Apparatus for adjusting a value representative of the number of instructions available but not yet issued for threads executing on a multithreaded processor comprising:
    means for storing an average rate at which each thread is intended to issue instructions;
    means for monitoring the value representative of the number of instructions available but not yet issued for a thread;
    means for increasing the value representative of the number of instructions available but not yet issued at a rate dependent upon the stored average rate for each thread;
    means for decreasing the value representative of the number of instructions available but not yet issued for a thread each time an instruction is issued on the thread; and
    means for preventing issuance of instructions on a thread if the number of instructions available but not yet issued falls below a defined value.

6. Apparatus according to claim 5 including means for accumulating the average rate at which each thread is intended to issue instructions into the value representative of the number of instructions available but not yet issued for a thread in a pool count accumulator.

7. Apparatus according to claim 6 including means for setting a maximum value for the value representative of the number of instructions available but not yet issued for a thread.

8. Apparatus according to claim 6 in which a thread which builds up an accumulation of instructions available but not yet issued may be allocated a burst of execution time in which instructions execute at a rate higher than the average rate, the burst being bounded by the value of the number of instructions available but not yet issued.

9. A method for adjusting a value representative of not yet issued instructions for threads executing on a multi-threaded processor, comprising the steps of:
    storing an average instruction issue rate for a thread in an average rate register when a program for executing on a thread is started;
    monitoring a value in a pool count accumulator that represents the number of instructions not yet issued that a thread may require to complete its tasks;
    incrementing the value of the number of instructions not yet issued in the pool count accumulator that a thread may require to complete its tasks based on the stored average instruction issue rate;
    decrementing the value in the pool count accumulator each time an instruction is issued to the thread;
    limiting the value in the pool count accumulator to a maximum number of instructions to be executed, the maximum number defining the number of instructions that a thread may build up to be executed later at a higher rate, wherein the limit on the value allows the duration of processor overload to be bound; and
    executing the number of instructions built up in the pool count accumulator at a higher rate defined by a burst rate register than the average instruction issue rate.

10. The method according to claim 9, wherein the pool count accumulator influences thread execution independently from a delay count accumulator.

11. The method according to claim 9, wherein the pool count accumulator keeps track of the average processor load and limits the duration of processor overloads to ensure that no one thread can take over the processor.

12. The method according to claim 9, wherein the average instruction issue rate is defined as AN=average issue rate*KR/processor clock rate.

13. The method according to claim 9, including the step of setting a pool filled trigger when the pool count accumulator value equals a maximum value.

* * * * *